Figure 1:
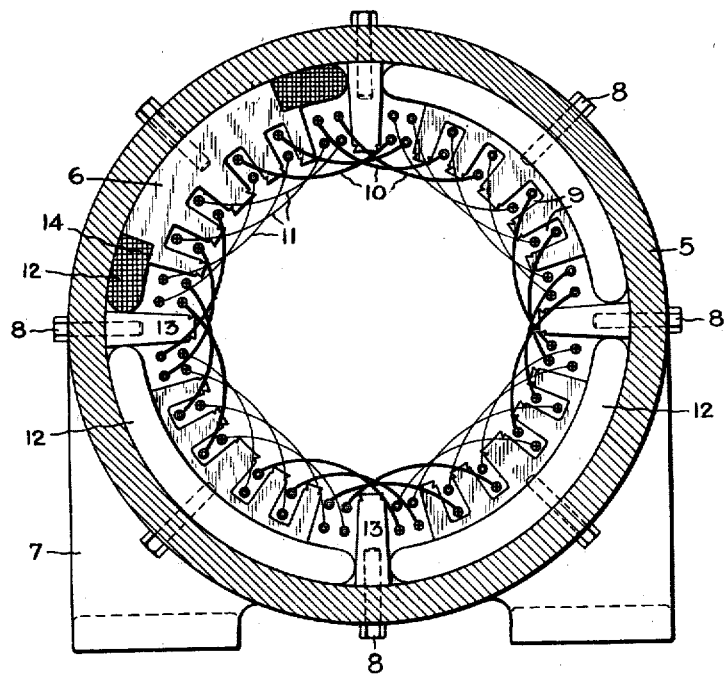

S. R. BERGMAN.
DYNAMO ELECTRIC MACHINE.
APPLICATION FILED MAY 13, 1916.

1,266,388.

Patented May 14, 1918.

Inventor,
Sven R. Bergman,
by
Att'y.

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DYNAMO-ELECTRIC MACHINE.

1,266,388.  Specification of Letters Patent.  Patented May 14, 1918.

Application filed May 13, 1916. Serial No. 97,426.

*To all whom it may concern:*

Be it known that I, SVEN R. BERGMAN, a subject of the King of Sweden, residing at Nahant, in the county of Essex, State of Massachusetts, have invented certain new and useful Improvements in Dynamo-Electric Machines, of which the following is a specification.

My invention relates to dynamo-electric machines and particularly to compensated direct current dynamo-electric machines. More especially the invention relates to a direct current dynamo-electric machine having a distributed compensating winding and a distributed exciting winding, and in particular to a compensated direct current dynamo-electric machine of the type disclosed in my U. S. Letters Patent No. 1,173,090, patented Feb. 22, 1916.

The invention has for its objects to provide an improved dynamo-electric machine having a novel field magnet structure for a distributed field winding, and to provide an improved arrangement of exciting windings for a direct current dynamo-electric machine particularly in combination with the novel field magnet structure of the invention. Another object of the invention is to provide a dynamo-electric machine having an improved field magnet structure for field windings in whole or in part of the general type described in my afore-mentioned patent. Other objects of the invention will be brought out in the course of the following descripiton.

My aforementioned Patent No. 1,173,090 describes a dynamo-electric machine having a distributed compensating winding and a distributed exciting winding each composed of uniform coils of substantially 50% pitch carried in distributed slots in a field magnet. The field magnet described in the patent consists of a laminated magnetic structure in which the magnetic material is distributed around the armature winding to form a substantially uniform air gap. In accordance with my present invention I provide a magnetic frame, preferably a circular steel frame, to which are secured laminated pole pieces having distributed slots on their inner peripheries for the accommodation of a distributed exciting winding, and a distributed compensating winding in compensated machines. The pole pieces are so arranged that a concentrated exciting winding can be wound on each pole piece, whereby the exciting field of the machine is produced by two component windings one a distributed winding and the other a concentrated winding.

Figure 2:
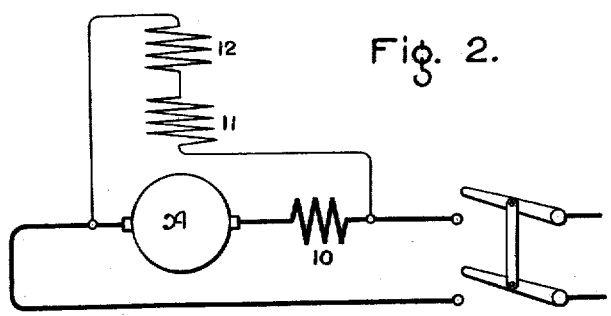
Figure 3:
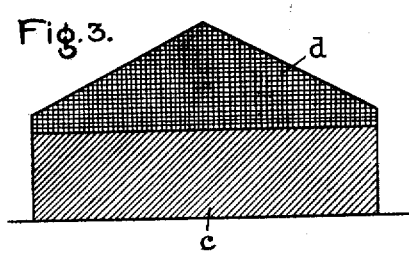

The novel features which I believe to be patentably characteristic of my invention are definitely indicated in the claims appended hereto. The principle of the invention and its application to direct current dynamo-electric machines will be understood from the following description taken in conjunction with the accompanying drawing, in which;

Figure 1 is a diagrammatic end view, partly in section, of a four pole dynamo-electric machine embodying my present invention; Fig. 2 is a diagram of the electrical connections of the windings of the machine of Fig. 1; and Fig. 3 is an explanatory diagram illustrating the flux distribution resulting from the distributed and concentrated exciting windings of the machine of Fig. 1.

The field magnet of my improved dynamo-electric machine comprises a circular magnetic frame 5 to which are suitably secured laminated magnetic pole pieces 6 each of which has a slotted inner periphery. Preferably, the magnetic frame 5 is a solid steel ring, and is mounted on a suitable base or pedestal 7 in any convenient manner. In the drawings I have shown bolts 8 for securing the pole pieces 6 to the magnetic frame 5. The slots 9 on the inner periphery of the pole pieces 6 are evenly distributed and are designed to carry a distributed compensating winding 10 and a distributed exciting winding 11. The distributed compensating and exciting windings are preferably of the type described in my aforementioned patent, that is to say, each winding is composed of uniform overlapping coils of substantially 50 per cent. pitch interleaved so that the two windings form mechanically a single two-layer lap winding.

A concentrated exciting winding 12 has one coil or spool thereof surrounding the base of each of the pole pieces 6. The pole pieces 6 with their associated winding spools (12) thus resemble the field magnet construction in direct current machines of the salient pole type. Commutating poles 13 of magnetic material are positioned between and spaced from the ends of the pole pieces 6 and are secured to the magnetic frame 5 by bolts 8. Each pole piece 6 is of sufficient depth to accommodate the surrounding coil of the concentrated exciting winding about the base of the pole piece. The pole pieces are, accordingly, preferably provided with a shoulder 14 at each end which projects over a portion of the surrounding coil of the concentrated exciting winding. In assembling, the coil of the concentrated exciting winding is first mounted on the base of the pole piece and the pole piece and coil are then secured to the steel frame 5 by the bolts 8. Each coil of the concentrated winding is thus firmly held between the frame 5 and the shoulders 14 of its associated pole piece.

The arcual widths of the pole pieces 6 and of the commutating poles 13 are such that a suitable space is provided between the same for the accommodation of the coils of the concentrated exciting winding. This space is also of such width as to form in effect a double width slot between each end of each pole piece and the adjacent commutating pole. The bottoms of these double slots are occupied by the conductors of the concentrated exciting winding coils. The top portion of the double slots coöperate with the distributed slots of the pole pieces to form substantially uniformly distributed slots over the entire inner periphery of the field magnet of the machine, and the distributed compensating and exciting windings 10 and 11 are assembled in such substantially uniformly distributed slots. The double slots on each side of the commutating poles 13 may be closed by non-magnetic wedges, while the slots in the pole pieces 6 may be closed by magnetic wedges in accordance with the principles described in my aforementioned patent.

The electrical connections of the windings of my improved dynamo-electric machine are indicated in the diagram of Fig. 2. The compensating winding 10 is connected in series with the commutated armature winding A. The distributed exciting winding 11 and the concentrated exciting winding 12 are represented as shunt connected windings, and are preferably connected in series with one another so as to enable the use of fine wire conductors for both exciting windings. It will of course be understood that either or both of the two exciting windings may, if desired, contain series coils or turns.

The flux distribution over one pole arc produced by the combined distributed and concentrated exciting windings of my present machine is diagrammatically represented in Fig. 3 of the drawings. The shaded rectangular area $c$ represents the flux due to the concentrated exciting winding 12, while the cross hatched pyramidal area $d$ represents the flux due to the distributed exciting winding 11. The total exciting flux of the machine is obviously the sum of these two fluxes and the resultant flux distribution over one pole arc of the machine is represented by the combined areas $c$ and $d$. The flux form is thus of a more nearly rectangular shape than in a machine having only the distributed exciting winding, and hence more flux can be got through the machine.

In machines of the type described in my aforementioned patent it frequently happens that the coils of the exciting winding are of larger cross-sectional size than the coils of the compensating winding. Obviously, these two windings can be best assembled as a mechanically single two-layer lap winding when the coils of both windings are of the same size. By the use of my present invention the coils of the distributed exciting winding can be made exactly the same size as the coils of the compensating winding, and the additional excitation required for the machine can then be obtained by the concentrated exciting winding.

The arrangement of the field windings in accordance with my present invention results in a most economical and efficient utilization of the materials, and in addition provides a cheap, rugged construction possessing excellent electrical characteristics. By sectionalizing the slotted portion of the field magnet, the exciting flux is forced to flow through the circular steel frame, and, due to the well known magnetic properties of steel, sudden variations in the exciting flux are thereby prevented. This is of particular advantage in motors whose exciting field is frequently altered in magnitude or reversed, since it prevents a too sudden change in the exciting flux with the resultant likelihood of disastrous flash-overs and similar difficulties.

What I claim as new and desire to secure by Letters Patent of the United States, is:—

1. A direct current dynamo-electric machine comprising a field magnet having a plurality of distributed slots on its inner periphery, a distributed exciting winding and a distributed compensating winding carried in said slots, said exciting winding and said compensating winding each being composed of substantially uniform coils interleaved so that the two windings form mechanically a single two-layer lap winding, and a concentrated exciting winding associated with said field magnet and adapted to coöperate with said distributed exciting winding to produce the exciting field of said machine.

2. A direct current dynamo-electric machine comprising a magnetic frame, a plurality of laminated pole pieces secured to said frame, each of said pole pieces having a plurality of distributed slots on its inner periphery, a distributed exciting winding and a distributed compensating winding carried in said slots, said exciting winding and said compensating winding each being composed of substantially uniform coils interleaved to form mechanically a single two-layer lap winding, and a concentrated exciting winding surrounding said pole pieces and adapted to coöperate with said distributed exciting winding to produce the exciting field of said machine.

3. A direct current dynamo-electric machine comprising a magnetic frame, a plurality of laminated pole pieces secured to said frame, each of said pole pieces having a plurality of distributed slots on its inner periphery, commutating poles positioned between and spaced from said pole pieces, the space between each end of each pole piece and the adjacent commutating pole forming a double slot coöperating with the slots of said pole pieces to form substantially uniformly distributed slots over the entire inner periphery of the field magnet of the machine, and a distributed exciting winding and a distributed compensated winding carried in said substantially uniformly distributed slots.

4. A direct current dynamo-electric machine comprising a magnetic frame, a plurality of laminated pole pieces secured to said frame, each of said pole pieces having a plurality of distributed slots on its inner periphery, commutating poles positioned between and spaced from said pole pieces, the space between each end of each pole piece and the adjacent commutating pole forming a double slot coöperating with the slots of said pole pieces to form substantially uniform distributed slots over the entire inner periphery of the field magnet of the machine, a distributed exciting winding carried in said slots, and a concentrated exciting winding surrounding said pole pieces and adapted to coöperate with said distributed exciting winding to produce the exciting field of said machine.

5. A direct current dynamo-electric machine comprising a magnetic frame, a plurality of laminated pole pieces secured to said frame, each of said pole pieces having a plurality of distributed slots on its inner periphery, commutating poles positioned between and spaced from said pole pieces, the space between each end of each pole piece and the adjacent commutating pole forming a double slot coöperating with the slots of said pole pieces to form substantially uniformly distributed slots over the entire inner periphery of the field magnet of the machine, a distributed exciting winding and a distributed compensating winding carried in said substantially uniformly distributed slots, said exciting winding and said compensating winding each being composed of substantially uniform coils interleaved so that the two windings form mechanically a single two-layer lap winding, and a concentrated exciting winding composed of coils surrounding said pole pieces and adapted to coöperate with said distributed exciting winding to produce the exciting field of said machine.

6. A direct current dynamo-electric machine having a field magnet comprising a circular steel frame, a plurality of laminated pole pieces secured to said frame, each of said pole pieces having a plurality of distributed slots on its inner periphery, and commutating poles positioned between and spaced from said pole pieces, and secured to said frame, the space between each end of each pole piece and the adjacent commutating pole forming a double slot coöperating with the slots of said pole pieces to form substantially uniformly distributed slots over the entire inner periphery of the field magnet.

7. A direct current dynamo-electric machine having a field magnet comprising a magnetic frame, a plurality of magnetic pole pieces secured to said frame, each of said pole pieces having a plurality of distributed slots on its inner periphery, and commutating poles of magnetic material positioned between and spaced from said pole pieces and secured to said frame, the space between each end of each pole piece and the adjacent commutating pole forming a double slot coöperating with the slots of said pole pieces to form substantially uniformly distributed slots over the entire inner periphery of the field magnet.

In witness whereof, I have hereunto set my hand this 11th day of May, 1916.

SVEN R. BERGMAN.

Copies of this patent may be obtained for five cents each, by addressing the "Commissioner of Patents, Washington, D. C."